United States Patent [19]
Ennis

[11] 3,755,844

[45] Sept. 4, 1973

[54] VEHICLE WRAP-AROUND CLEANING APPARATUS

[76] Inventor: George Thomas Ennis, 1354 E. State St., Sharon, Pa.

[22] Filed: Aug. 10, 1972

[21] Appl. No.: 279,364

Related U.S. Application Data

[63] Continuation-in-part of Ser. No. 178,191, Sept. 7, 1971, Pat. No. 3,720,972.

[52] U.S. Cl. ............................. 15/21 D, 15/DIG. 2
[51] Int. Cl. .............................................. B60s 3/06
[58] Field of Search ...................... 15/DIG. 2, 21 D, 15/21 E, 53, 97

[56] References Cited
UNITED STATES PATENTS

| | | | |
|---|---|---|---|
| 3,624,851 | 12/1971 | Barber | 15/21 D |
| 3,704,476 | 12/1972 | Hanna | 15/21 D |

*Primary Examiner*—Edward L. Roberts
*Attorney*—William E. Schuyler, Jr., Gene W. Stockman et al.

[57] ABSTRACT

A first embodiment includes a vehicle wrap-around rotary brush-type cleaning assembly having a first arm pivotally mounted at one side of the path of a vehicle and a second arm pivoted thereto carrying rotatable brush means at one end. Spring tensioning means are connected between the first arm and the frame and between the second arm and the first arm to maintain the arms in a normal open position. A compression spring is positioned between the two arms to limit relative movement in one direction and urge the arms back to their normal position. A damping cylinder connected between the arms by a pin and slotted plate connection permits relative initial movement between the arms prior to any damping taking effect. The brush moves across the front, along the side and across the back of a vehicle. Two brush assemblies may be disposed directly opposite each other on each side of the path with the brushes in overlapping relation to clean both sides of a vehicle. In an alternative embodiment the second arm may comprise an outer portion pivotally connected to the first arm and an inner portion which moves telescopically within the outer portion and which carries the rotatable brush means. In the alternative embodiment the pin and slotted plate connection between the damping cylinder and the arms is replaced by a linearly sliding lost motion linkage, and the travel of the arms away from the vehicle path is more limited to maintain the arms within the laterally outermost dimension of the supporting frame of the assembly.

11 Claims, 23 Drawing Figures

Patented Sept. 4, 1973

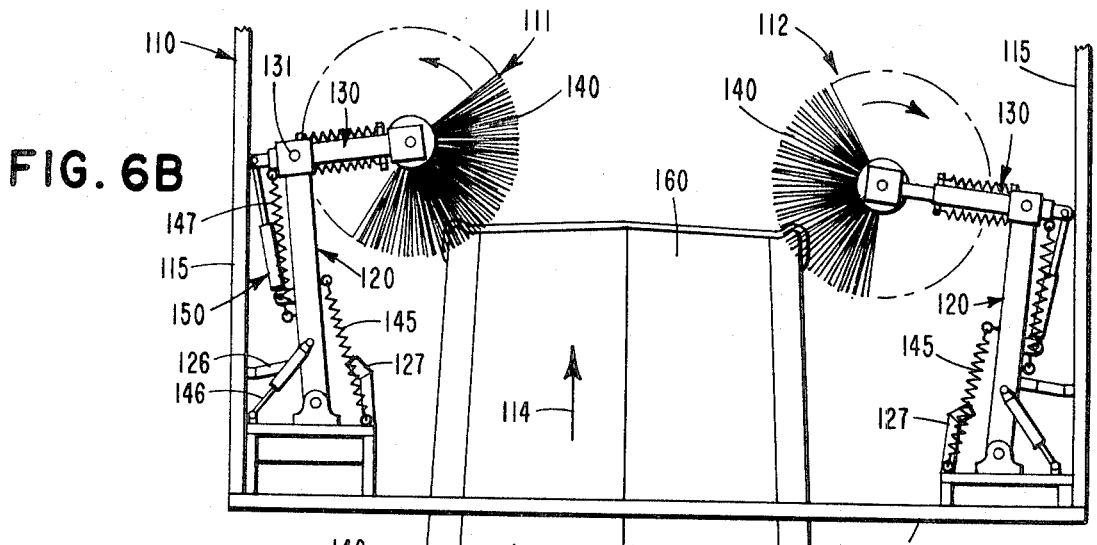

VEHICLE WRAP-AROUND CLEANING APPARATUS

CROSS REFERENCE TO RELATED APPLICATIONS

This application is a contination-in-part of my copending application Ser. No. 178,191, dated Sept. 7, 1971, now U.S. Pat. No. 3,720,972, entitled "Vehicle Wrap-Around Cleaning Apparatus."

BACKGROUND OF THE INVENTION

1. Field of the Invention

This invention relates generally to vehicle washing apparatus and, more particularly, to a vehicle washing apparatus employing one or more wrap-around rotating brush-type assemblies for automatically cleaning the front, sides and back of a vehicle.

2. Description of the Prior Art

Numerous devices have been available for washing vehicles in the past employing wrap-around type rotary brush assemblies for cleaning the front, sides and back of a vehicle such as a car. Many such prior art devices, however, have been objectionable in that they have been complicated in construction, requiring the use of extensive power control means to effect a proper movement of the brush supporting arms to effectively clean the vehicle and requiring a substantial amount space within which to operate. Such devices have often required close supervision and extensive maintenance and adjustment. Consequently, such devices have been expensive to construct, operate and maintain.

Other such devices have employed burshes supported by arms which pass overhead of a vehicle being washed thus creating the possibility of damage to a vehicle. Furthermore, other such prior known devices have not operated satisfactorily to clean the vehicle. The brushes of still other prior art cleaning devices have had a tendency to snag on a vehicle, thus causing damage thereto.

SUMMARY OF THE INVENTION

Among the objects of the present invention is to avoid the disadvantages of prior art vehicle washing devices enumerated above. Another object of the present invention is to provide a vehicle washing apparatus which is simple in construction, thus providing an extremely compact, inexpensive and efficient unit which requires a limited amount of space within which to operate. Still another object is to provide a vehicle washing apparatus employing a wrap-around type brush assembly whose arms are primarily controlled by tension and compression spring means. A further object of the invention is to provide a vehicle washing apparatus which effectively cleans the front, sides and back of the vehicle. Still another object of the invention is to provide a vehicle washing apparatus in which the arms supporting the brush unit do not extend beyond the limits of the supporting frame at any time during movement of the brush around the vehicle.

According to the present invention, there is provided a vehicle washing apparatus in which a brush assembly is supported in the path of a vehicle by mounting means attached to a framework at the side of the path of the vehicle, whereby a car passing along the path engages a rotary brush which travels across the front, along the side and across the back of a vehicle. The brush is rotated in a direction whereby the reaction force of the brush against the vehicle causes the brush to move itself around the vehicle.

In one specific embodiment of the invention, a first arm is pivotally mounted at one end to frame means outside the path of the vehicle. A second arm comprises an outer portion, which is pivotally connected at one end to the distal end of the first arm, and an inner portion, which moves telescopically within the outer portion and which supports a rotatable brush in the path of the vehicle. Spring tensioning means are provided between the first arm and the frame means and between the first arm and the second arm to normally maintain the arms in an open position whereby the second arm is generally transverse of the path of the vehicle. Mechanical stops limit the movement of the first arm relative to the frame to a predetermined amount of travel such that the arms remain at all times within the outermost portions of the supporting frame. Other mechanical stops limit the relative pivoting movement between the arms in each direction. A damping cylinder is connected between the two arms by a lost motion linkage whereby the second arm is free to move a predetermined distance prior to the damping cylinder taking effect. Two such brush assemblies as just described may be disposed directly opposite each other on each side of the path of the vehicle whereby the brushes are initially in overlapping relation to insure complete washing of the front, both sides and the back of the vehicle.

In another embodiment of the invention the apparatus is substantially similar to the above described embodiment but omits the telescoping feature of the second arm and the mechanical stops which serve to restrain the movement of the pivoting arms to points within the outer dimensions of the frame.

BRIEF DESCRIPTION OF THE DRAWINGS

Other objects and advantages of the invention will become apparent by reference to the more detailed description of the invention and the accompanying drawings which follow, wherein:

FIG. 6b through 6g show the subsequent positions of the components as a vehicle is being washed during its passage through the device;

FIG. 7 is a front elevation view of the vehicle washing device of FIG. 6a;

DESCRIPTION OF THE INVENTION

Figure 1:
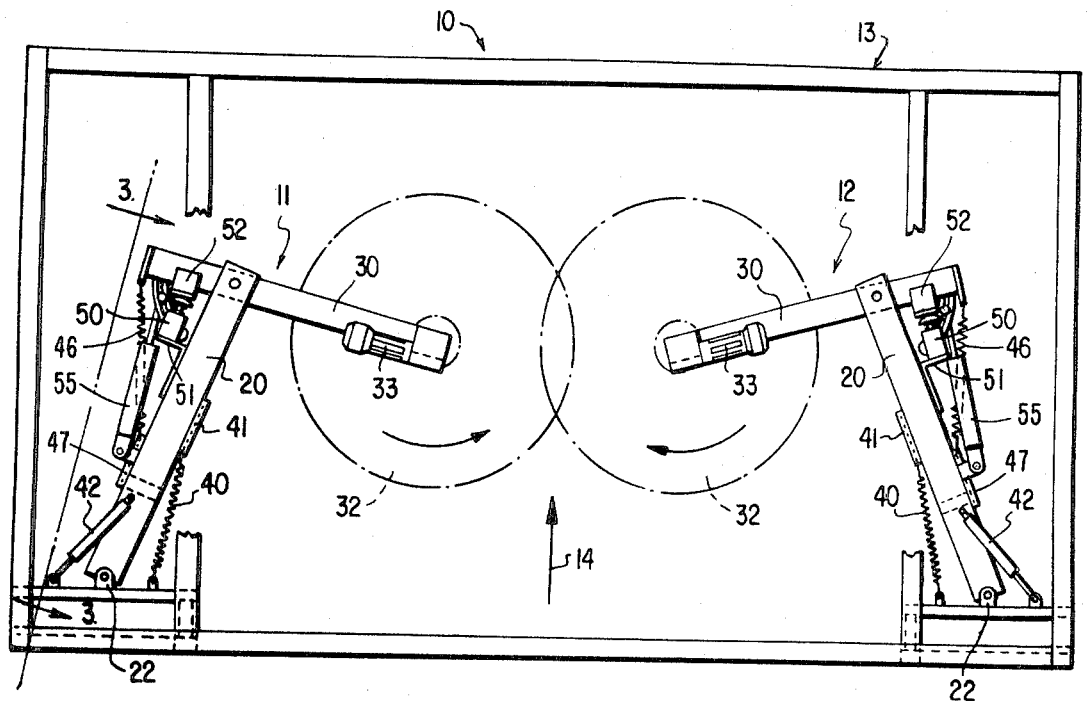
FIG. 1 is a top plan view of a vehicle washing device according to one embodiment of the invention, showing two brush assemblies disposed directly opposite each other on each side of the path of a vehicle to be washed.
Figure 2:
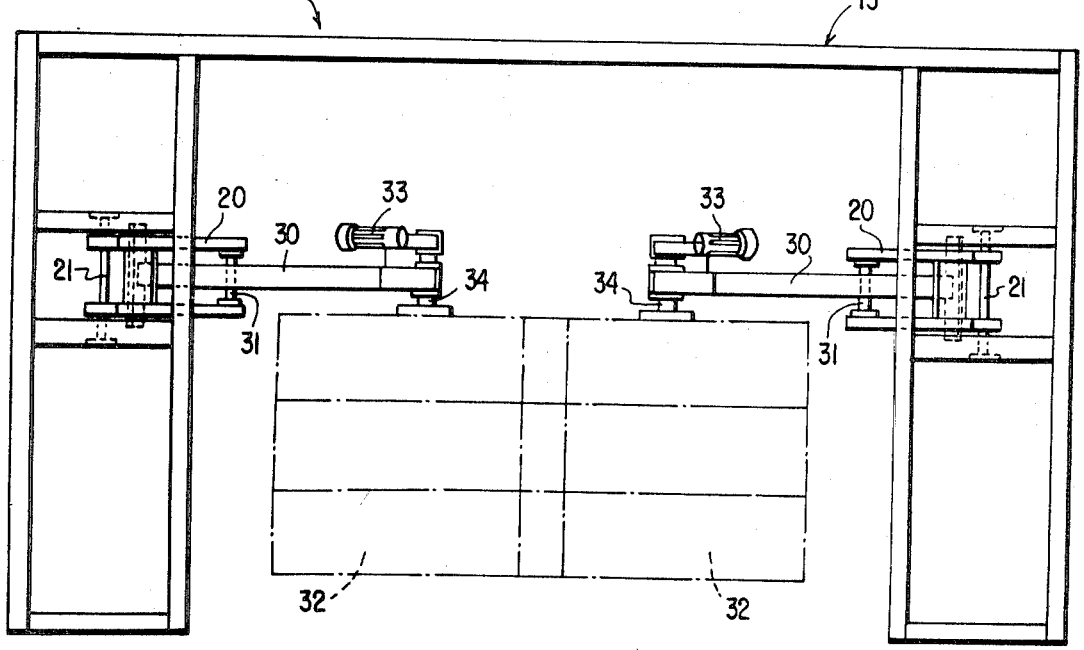
FIG. 2 is a front elevation view of the vehicle washing device shown in FIG. 1.

Referring to the drawings, FIGS. 1 through 5g show a vehicle washing apparatus 10 according to one embodiment of the present invention, comprising a pair of brushing units 11 and 12 mounted on suitable supporting frame means generally indicated by the numeral 13. The frame means 13 includes suitable side frame members and top members extending over a predetermined path, generally indicated by the arrow 14, of a vehicle to be washed. The brush assemblies 11 and 12 are disposed directly opposite each other on each side ot the path 14.

Figure 3:
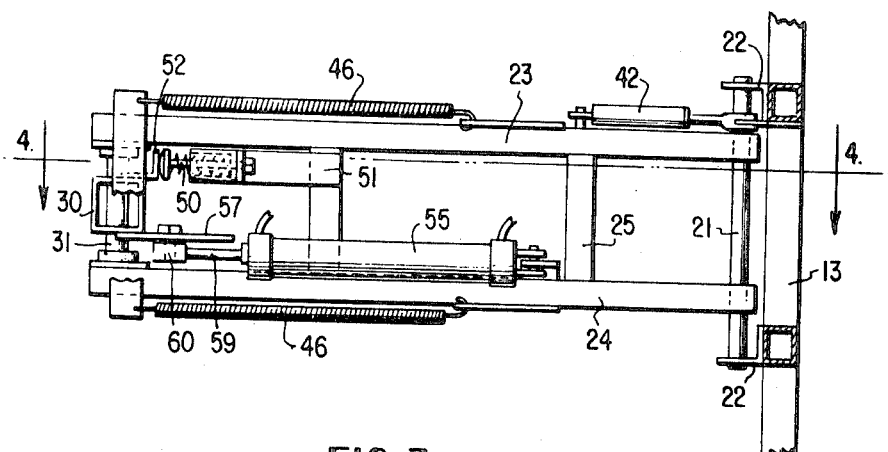
FIG. 3 is a side elevational view of the arms of one of the brush assemblies taken along line 3—3 of FIG. 1.

Each of the brush assemblies 11 and 12 comprises a first arm 20, pivotally mounted at its outer end to a pivot rod 21 attached to the side of the frame means 13 by suitable bracket means 22. Arm 20 is comprised of an upper beam 23 and a lower beam 24 connected together by intermediate beams 25, as best shown in FIG. 3. In its normal open position arm 20 extends forwardly along and generally parallel to the path 14 of the vehicle.

A second arm 30 is pivotally attached to the opposite outside end of the first arm 20 by a suitable pivot rod 31. The pivotal connection between the first arm 20 and the second arm 40 is located at a point intermediate the ends of second arm 30, as shown in FIG. 1. In its normal open position arm 30 extends generally transversely of the path 14 from a point at the side of the path to a point intermediate of the path.

A rotary brush 32 is attached to the inner end of arm 30 and depends downwardly therefrom for rotational movement about shaft 34 constituting a vertical axis. Suitable motor means 33 are mounted on top of the inner end of arm 30 to rotate the brush 32, preferably is of the type having soft bristles which collapse when the brush is not rotating but which expand outwardly during rotation.

As shown in FIG. 1, the rotary brushes 32 of the brush assemblies 11 and 12, in their normal position prior to contact by a vehicle, are positioned generally in the center of the path in overlapping relation to insure that the center of the front of the vehicle is adequately washed. The brushes 32 of the brush assemblies 11 and 12 are rotated in opposite directions as shown by the arrows in FIG. 1, whereby the force of the brush against the vehicle causes the brush 32 of brush assembly 11 to move to the left across the front of the vehicle, around the corner, back along the side, and right across the back of the vehicle, while the brush 32 of brush assembly 12 moves to the right across the front of the vehicle, back along the right side and left across the back of the vehicle as the vehicle is moved forwardly along the path. During the cleaning operation the vehicle 35 may be advanced through the vehicle washing apparatus in the direction of arrow 14 by means of any conventional conveying device installed at the bottom or base of the apparatus for connection to the vehicle. A conveying device is not illustrated in the drawings since any well-known and conventional conveying apparatus may be employed. Alternatively a guide rail system may be installed whereby the vehicle may be driven through under its own power.

A first tension spring means 40 normally maintains each arm 20 in an inwardly extended position whereby the arm extends forwardly generally parallel to the path of the vehicle. Spring means 40 is attached at its inner end to the frame 13 and in the outer end to a suitable bracket 41 attached to a point intermediate the ends of the arm 20 on the inside thereof. Bracket 41 is provided with a plurality of openings to permit the tension of the spring to be varied by attaching the outer end thereof to one of the openings. If desired, two such tension springs 40 may be employed positioned at the top and bottom of the arm 20. A suitable spring damper 42 is attached at one end to the frame means 13 and at its other end to the arm 20 to further regulate and control the movement of the arm 20. If desired, two such spring dampers may be employed, attached to the bottom and the top of the arm 20.

A second tension spring means 46 is attached at its inner end to a bracket 47 mounted on the outside of each arm 20 and at its outer end to the outer end of arm 30 extending beyond the point at which the two arms are pivotally connected. Bracket 47 also is provided with a plurality of openings to permit an adjustment of the tension of spring means 46 by attaching the spring to one of the various openings. Spring means 46 normally maintains arm 30 in an open position extending generally transversely of the path 14 and generally perpendicular to arm 20.

Figure 5A:
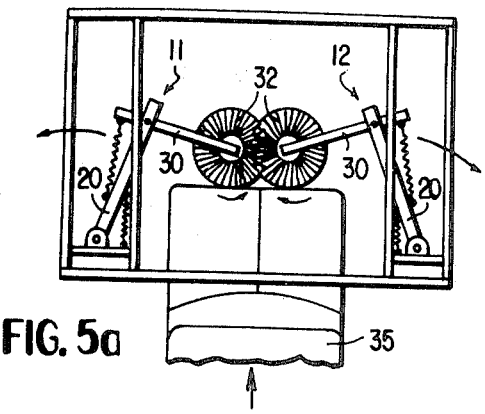
FIG. 5a through 5g are schematic top plan views of the vehicle washing device of FIG. 1, illustrating the various positions of the brushes as a vehicle is being washed during its passage through the device.

A compression spring means 50 is mounted on a bracket 51 attached to each arm 20 at a point on the outside thereof adjacent the pivotal connection between the two arms 20 and 30. An abutment means 52 is attached to the inside of arm 30 at a point outside the pivotal connection to arm 20 whereby the abutment means 52 contacts the end of compression spring 50 when arm 30 is pivoted forwardly and outwardly with respect to arm 20. Thus compression spring 50 not only tends to limit the relative movement between the arms in one direction but also urges the second arm 30 back towards its normal position with respect to arm 20 after arm 30 has been moved outwardly away from its normal position through initial contact with a vehicle. This arrangement is highly advantageous in that it facilitates the pivoting of the two arms with respect to each other as the brush rounds the front corner of the vehicle and begins its movement down along the side as shown in FIG. 5b. For this purpose, it is to be noted that the compression spring has a greater force than tension spring 46. Moreover, upon initial contact with a vehicle, the compression spring functions to hold the brush on the front end of the vehicle for a longer period of time since it operates to initially inhibit relative pivotal movement between the arms 20 and 30. Thus, as shown in FIGS. 5a and 5b, the arms 20 and 30, as the brushes 32 move across the front of the vehicle, tend to maintain their initial position approximately perpendicular to each other. It is further apparent that, by use of this arrangement during the initial washing of the front of the vehicle, essentially only the first arm 30 pivots outwardly while the two arms together generally maintain their same relative initial position to provide a more effective washing and brushing of the vehicle.

Figure 4:
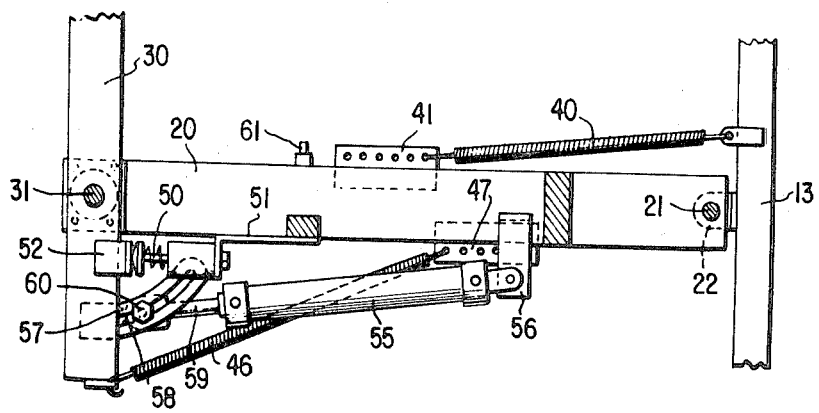
FIG. 4 is a view taken along line 4—4 of FIG. 3.

A hydraulic arm control damping unit or cylinder 55 is pivotally attached at one end to a bracket 56 mounted on the outside of arm 20 and at the other end to a lost motion linkage comprising a slotted plate 57 attached to the outer end of arm 30, as best shown in FIGS. 3 and 4. Preferably plate 57 is provided with a curved slot 58. The rod 59 of cylinder 55 is attached for movement in slot 58 by means of a suitable bolt connection 60. The hydraulic cylinder provides a further means for evenly controlling the relative movement between the two arms 20 and 30 during the washing cycle. The curved slot is particularly advantageous in that, as the brush 32 rounds the front corner of the vehicle, as shown in FIG. 5b, the bolt 60 is permitted to move the length of the slot prior to the cylinder 55 taking effect. This has the result of not restricting the pivoting movement of the arms as the brush begins its movement back along the side of the vehicle. As the arms 20 and 30 continue to pivot to closed position, as shown in FIG. 5d, the bolt reaches the end of the slot and the damping cylinder then becomes effective to provide an even, controlled movement between the two arms to increase the washing efficiency of the brush. Conversely, as the brush 32 passes the back corner of the vehicle, as shown in FIG. 5f, the bolt again is permitted to move the length of the slot in an opposite direction to facilitate initial movement of the brush back across the end of the vehicle without restriction from the damping cylinder. As the end of the slot is reached, the damping cylinder again becomes effective to provide even, controlled movement of the arms to again increase the ability of the brush to wash the back of the vehicle.

Figure 5E:
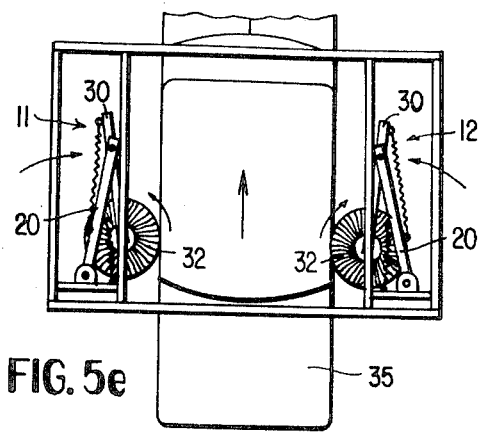
Figure 5B:
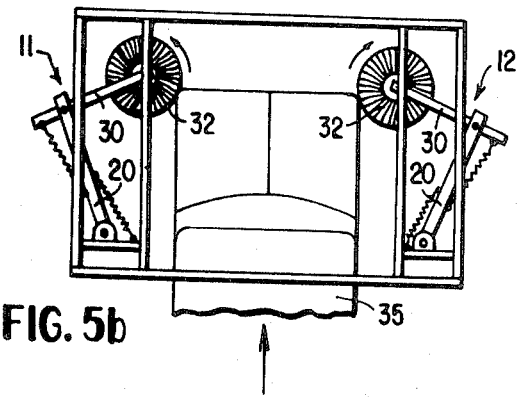
Figure 5F:
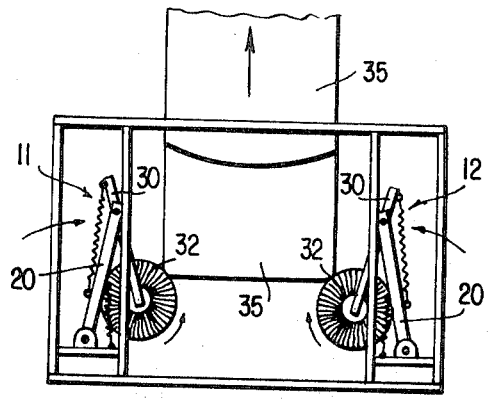
Figure 5C:
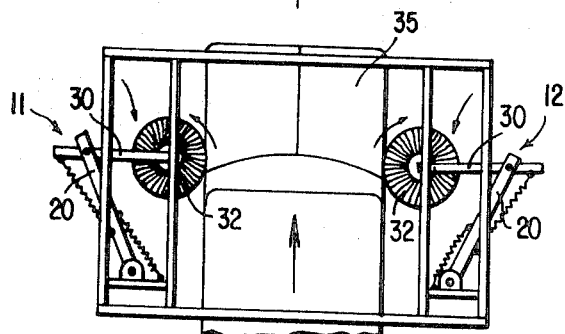
Figure 5G:
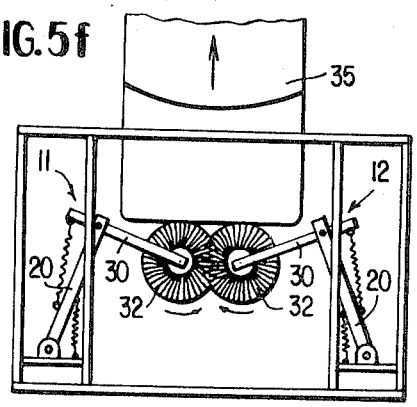
Figure 5D:
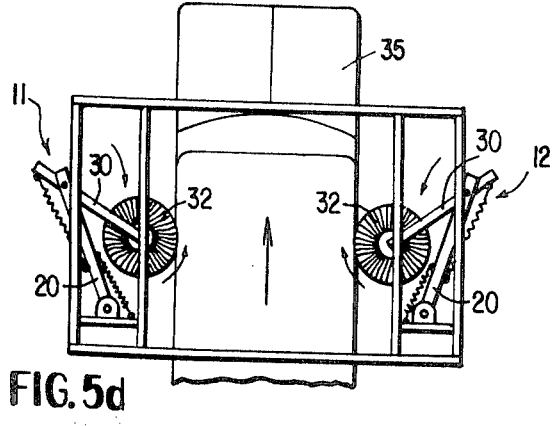

As shown in FIG. 4, a pivoting arm bumper 61 is mounted on the inside of arm to function as a stop means when the arms 20 and 30 are in a completely closed position, as shown in FIG. 5e.

Figure 6A:
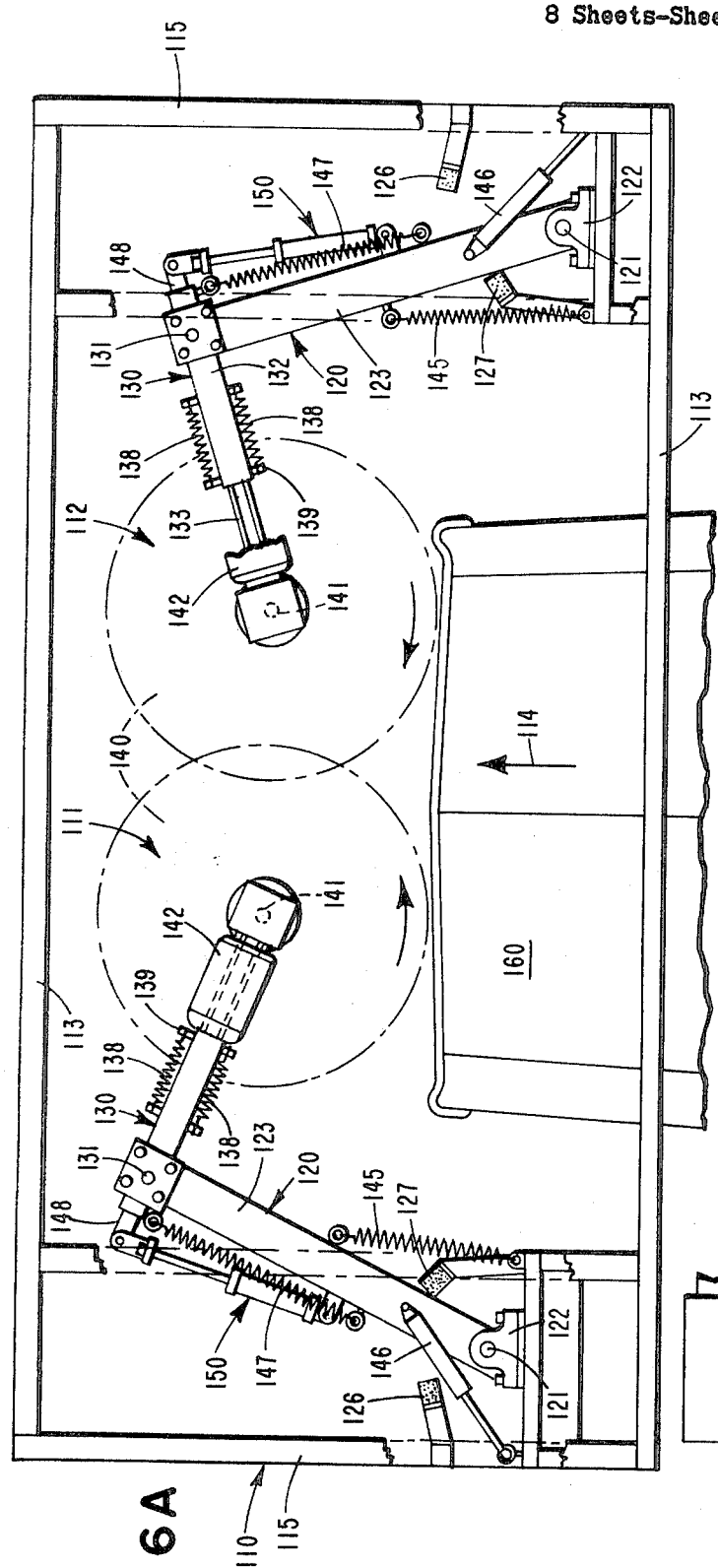
FIG. 6a is a top plan view of an alternative embodiment of the vehicle washing device showing the device in its initial non-operating configuration prior to the brushes contacting a vehicle to be washed.
Figure 6E:
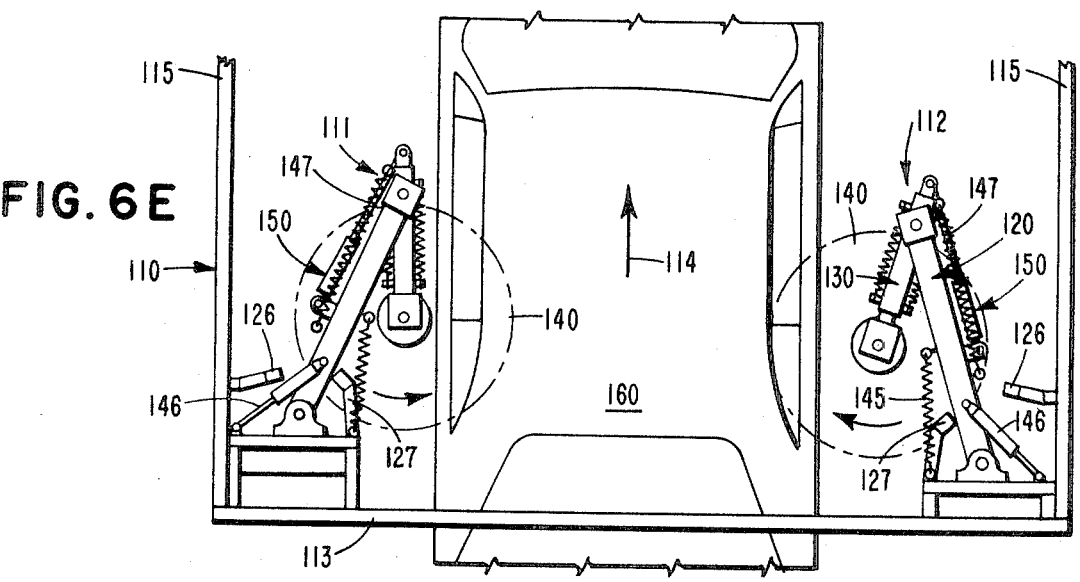
Figure 6F:
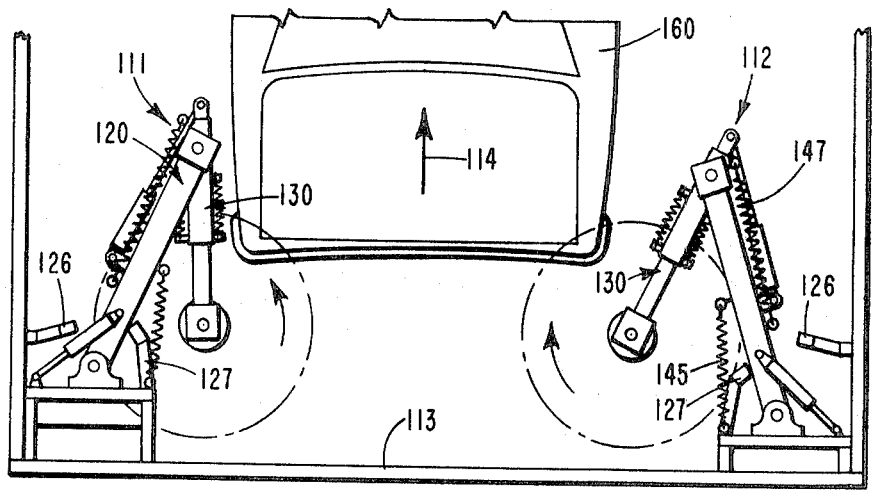
Figure 6G:
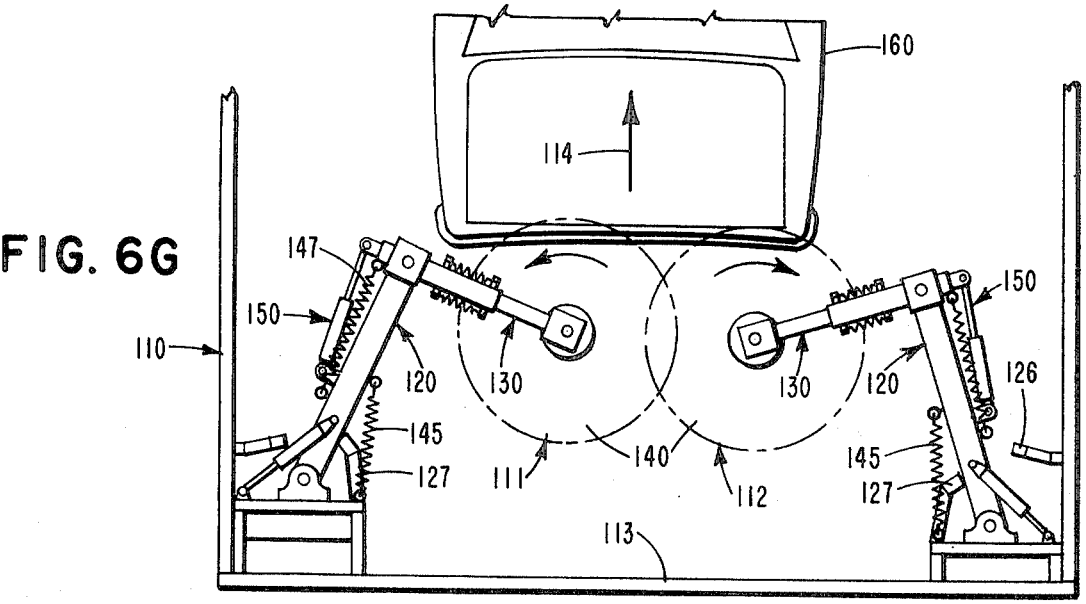
Figure 7:
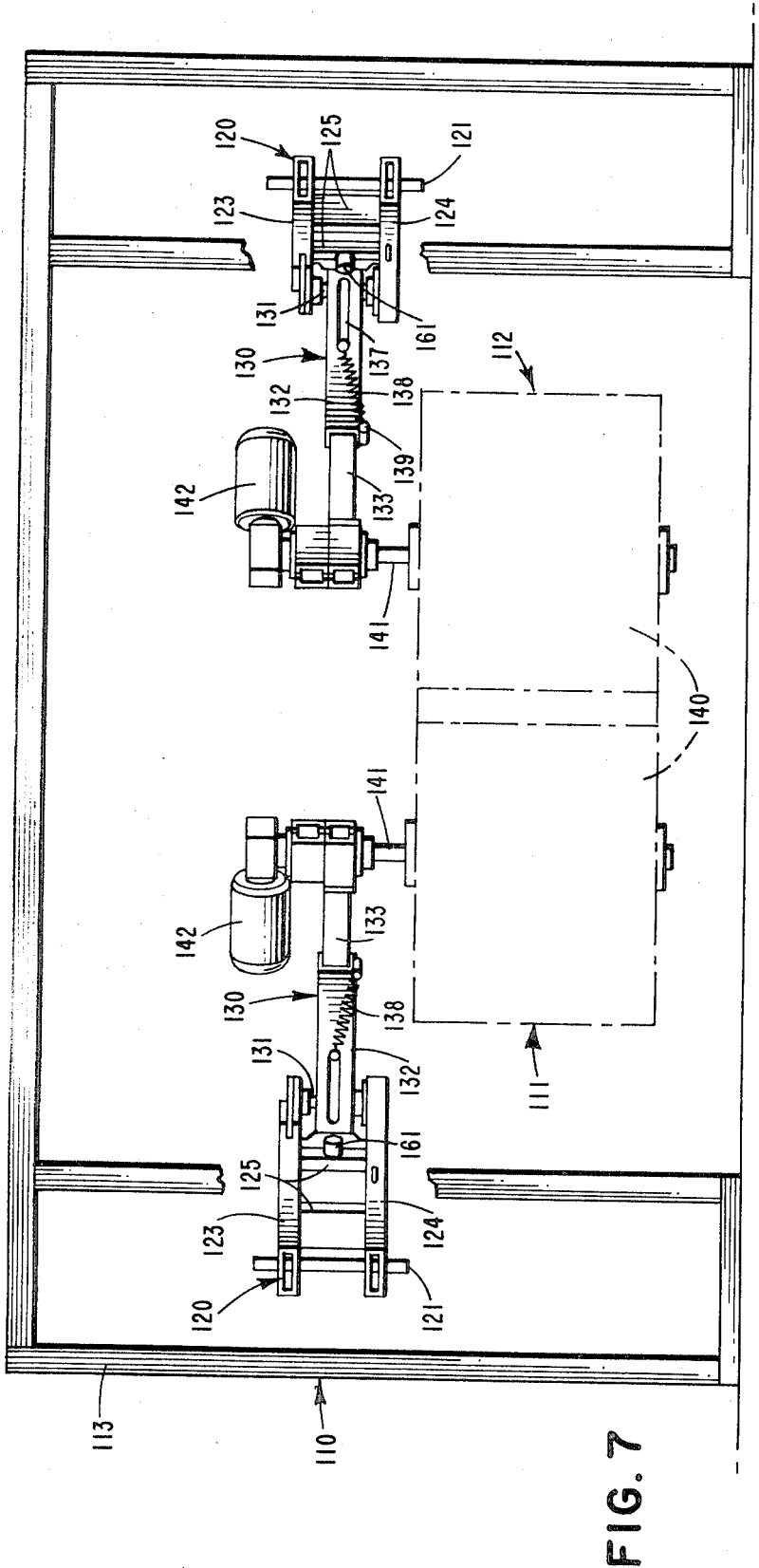
Figure 8:
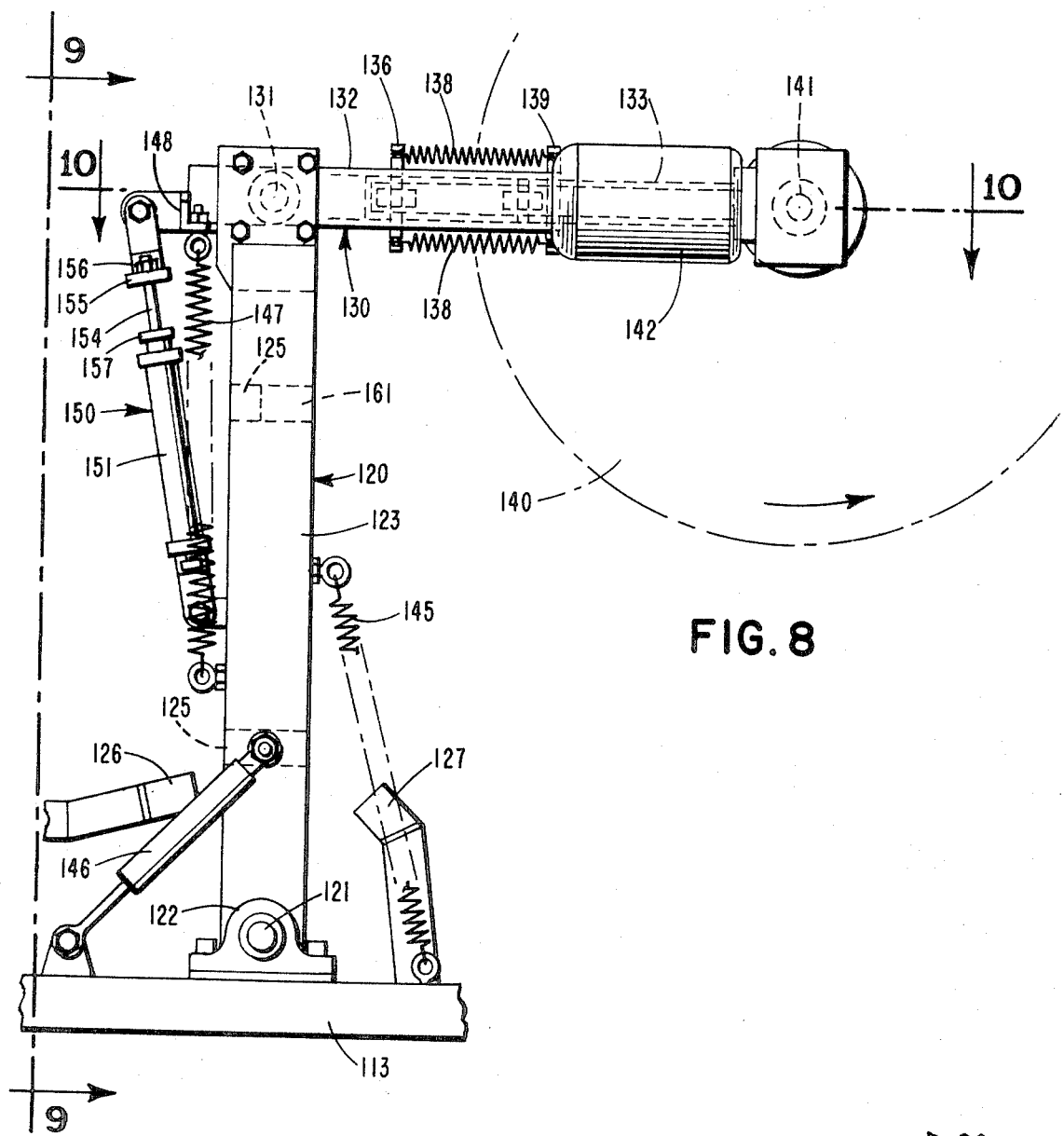
FIG. 8 is a partial top plan biew of one brush assembly of the vehicle washing device of FIG. 6a showing the assembly in an operating position pivoted outwardly of the vehicle path from its initial position.
Figure 9:
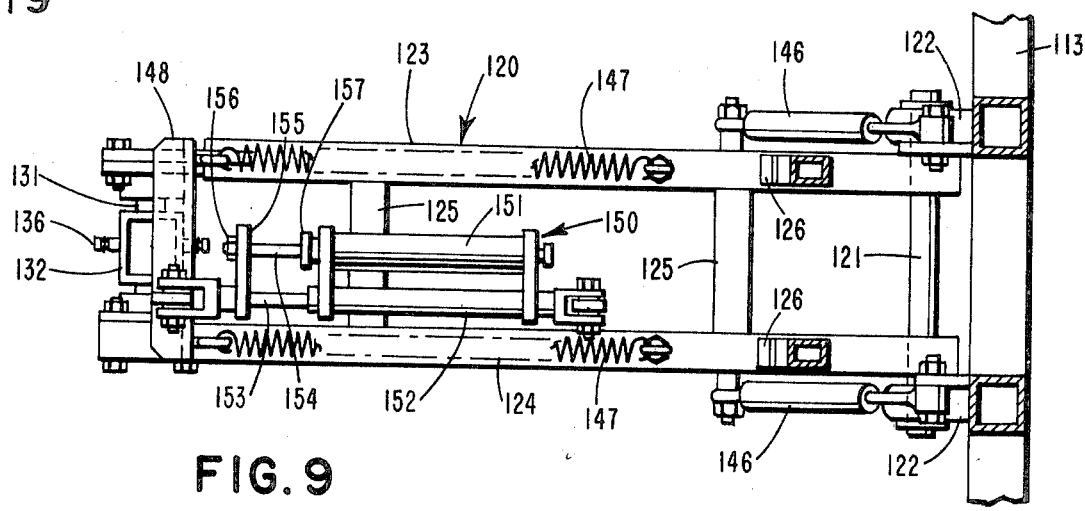
FIG. 9 is a side view of the brush assembly of FIG. 8, taken along lines 9—9.

FIGS. 6a-11 illustrate a vehicle washing apparatus 110 according to an alternative embodiment of the present invention. This embodiment comprises a pair of brushing units 111 and 112 mounted on suitable supporting frame means generally indicated by the numeral 113. The frame means 113 includes suitable side frame members and top members extending over a predetermined path, generally indicated by the arrow 114, of a vehicle to be washed. The brush assemblies 111 and 112 may be disposed either slightly offset from one another as shown in FIG. 6a directly opposite each other on each side of the path 114. Each of the brush assemblies 111 and 112 comprises a first arm 120, pivotally mounted at one end to a pivot rod 121 attached to the side of the frame means 113 by suitable bracket means 122. Arm 120 comprises an upper beam 123 and a lower beam 124 connected together by intermediate beams 125, as shown in FIGS. 7 and 9. Pivotal movement of the arm 120 is confined within predetermined limits by bumper means 126 and 127. Bumper means 126 limits the movement of the arm outwardly of the vehicle path such that at no time does any part of the brush assemblies 111 or 112 project outwardly of side frame member 115. Bumper means 127 limits the movement of the arm 120 in the direction toward the vehicle path 114 such that the brush assemblies 111 and 112 are limited to a predetermined amount of overlap.

Figure 10:
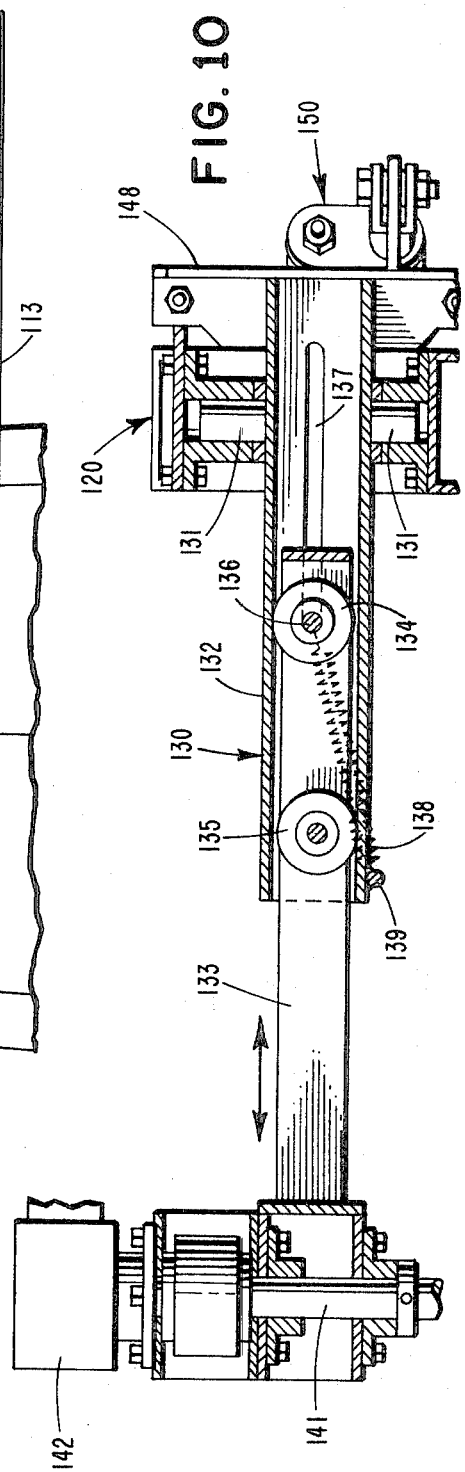
FIG. 10 is a sectional view of the second arm of the brush assembly of FIG. 8, taken along lines 10—10.

A second arm 130 is pivotally attached to the distal end of the first arm 120 by a suitable pivot rod 131, as shown in FIGS. 7 and 10. This second arm 130 comprises an outer portion 132, which is joined adjacent one end by the pivot rod 131 to the first arm 120, and an inner portion 133 which is adapted to move reciprocally and telescopically within the distal end of the outer portion 132. This reciprocal and telescoping movement of portion 133 within portion 132 is facilitated by rollers 134 and 135 mounted on inner portion 133. These rollers are sized and positioned to provide rolling contact with the upper and lower surfaces of the interior of outer portion 132, as illustrated in FIG. 10. The shaft 136 attaching roller 134 to inner portion 133 extends beyond the sides of arm portion 133 and outwardly through slots 137 on each side of outer portion 132. The outwardly extending portion of shaft 136 are connected to outer arm portion 132 by springs 138, which extend between the shaft 136 and spring mounting 139. The function of this spring and mounting assembly is to urge the inner portion 133 outwardly of outer portion 132.

A rotary brush 140 is rotatably attached to the exposed end of inner arm portion 133 and depends downwardly therefrom on a vertical shaft 141 (FIG. 7). Suitable motor means 142 are mounted on top of the exposed end of inner arm portion 133 to rotate the brush 140, which brush preferably is of the type having soft bristles that collapse when the brush is not rotating but that expands outwardly during rotation.

A first tension spring 145 normally maintains each arm 120 in an inwardly extended position, as shown in FIG. 6a. Spring 145 is attached at one end to the frame 113 and at its opposite end to the side of arm 120 toward the vehicle path. If desired, two such tension springs 145 may be employed, positioned at the top and the bottom of the arm 120. A suitable spring damper 146 is attached at one end to the frame means 113 and at its opposite end to the arm 120 to further regulate and control the movement of the arm 120. If desired two such spring dampers may be employed attached to the bottom and the top of the arm 120.

A second tension spring 147 is attached at one end to the side of arm 120 away from the vehicle path 114 and at its opposite end to a bracket 148 that is attached to the end of second arm portion 132 which extends beyond the pivot 131 and is opposite the end within which arm portion 133 telescopes. Bracket 148 also serves as a stop limiting the pivoting movement of arm 130 in the direction away from the entering vehicle to a perpendicular relationship with arm 120. The spring 147 normally maintains arm 130 generally perpendicular to arm 120 and extending inwardly toward the vehicle path 114.

Figure 11:
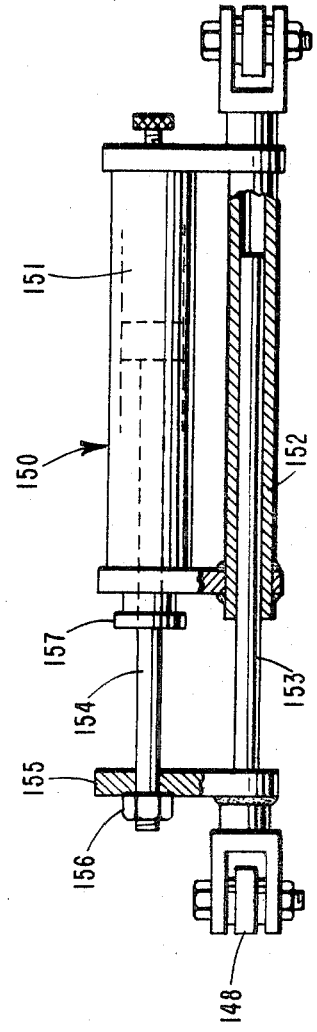
FIG. 11 is a side view, partially in section, of the hydraulic arm control damping unit of FIG. 8.

A hydraulic arm control damping unit 150, as shown in FIGS. 8, 9 and 11, is pivotally attached at one end to the same side of arm 120 as is the spring 147. The opposite end of the hydraulic damping unit 150 is pivotally attached to the same bracket 148 as is spring 147. The damping unit 150 comprises a hydraulic cylinder 151 rigidly attached parallel to a tubular cylinder mount 152, within which telescopes sliding control arm 153. Sliding control arm 153 is attached to the hydraulic cylinder piston rod 154 by a linear lost motion linkage comprising control arm bracket 155 fixed to arm 153 and freely slidable between stops 156 and 157 attached to the piston rod such that a predetermined amount of telescoping motion by the control arm 153 outwardly of the stationary cylinder mouth 152 may occur prior to the damping action of the cylinder 151 taking affect. This lost motion linkage serves the same function as the plate and curved slot linkage of the previously described embodiment in allowing initial free pivoting movement of the arms as the brush begins its movement back along the sides of the vehicle (FIG. 6b).

As the arms 120 and 130 continue to pivot to the closed position as shown in FIGS. 6c and 6d, the lost motion linkage reaches the end of its free travel against stop 156, and the damping cylinder then becomes effective to provide an even, controlled damping action between the two arms to increase the washing efficiency of the brush. Conversely, as the brush 140 passes the back corner of the vehicle, as shown in FIG. 6f, the lost motion linkage again permits the control arm 153 to move the limit of the free play in an opposite direction to facilitate initial movement of the brush across the back end of the vehicle without restriction from the damping cylinder 151. As the end of this free play is reached against stop 157, the damping cylinder 151 again becomes effective to provide an even, controlled movement of the arms to again increase the ability of the brush to wash the back of the vehicle. A pivoting arm bumper 161, as shown in FIGS. 6a and 8, is mounted on the side of the arm 120 adjacent the path of the vehicle, to function as a stop means when the arm 120 and 130 are in a completely closed position as shown in FIG. 6e.

The operation of the vehicle washing apparatus of the present invention is best understood by reference to FIGS. 5a through 5g for the initial embodiment and FIGS. 6a through 6g for the alternative embodiment. In view of the substantial similarity of operation between the initial embodiment and the alternative embodiment, despite substantial structural differences, only the operative steps of the alternative embodiment will be described in detail. Beginning with FIG. 6a, the arms 120 and 130 of the brush assemblies 111 and 112 are in their normal open positions such that the arms 130 extend primarily transversely of the path 114 of the vehicle 160 to position the brushes 140 centrally of the path in overlapping relation. As the vehicle 160 contacts the brushes 140, the rotative force of the brushes in the direction of the arrows causes the brushes to move in opposite directions across the front toward the outside corners of the vehicle. As the brushes move across the front of the vehicle, the various pivot and tension spring connections cause the arms 120 and 130 to maintain their same general perpendicular relative positions to provide increased brushing action in the front of the vehicle.

As the brush assemblies 111 and 112 continue to move outwardly of the center of the vehicle path, the arms 130 contact the bumpers 126, as shown in FIGS. 6b, to limit the outward travel of the arm 120. The brushes 140 may continue to move outwardly by telescoping the inner and outer portions of the second arm 130 to a fully collapsed position.

Refferring to FIG. 6c, as the brushes 140 pass the forward corners of the vehicle, the arms 130 then begin to pivot toward a closed position with respect to arms 120. It is to be noted that the moment about the pivot 131 created by the force of the rotating brush at the distal end of arm 130 against the vehicle is greater than the moment created by the force of the tension springs 147 attached to bracket 148, thus causing the arms 130 to pivot against the force of the springs.

As shown in FIGS. 6b and 6c, at the time the brushes 140 reach the corners of the vehicle, the arms 120 have moved to approximately their maximum pivoted position toward the side of the vehicle washing apparatus. By virtue of the bumpers 126 the arms are at all times constrained within the maximum width dimension of the frame means of the car washing apparatus. As the vehicle continues to move through the apparatus, the arms 130 then continue to pivot toward arms 120 as the sides of the vehicle are washed, as shown in FIGS. 6d and 6e. As the arms 120 and 130 continue to pivot toward a closed position with respect to one another the arms 120 may then begin to pivot away from bumpers 126 and toward bumpers 127 due to the force exerted by tension springs 145. Additionally, in this condition, the fully collapsed telescoping portions 132 and 133 of the arms 130 may begin telescoping outwardly to the original fully extended position, as shown in FIG. 6f. During this extension the force of the spring 145 and 147 serve to urge the brushes 140 against the sides of the vehicle with sufficient force provide an effective brushing and cleaning action.

As the vehicle continues further through the washing apparatus, the brushes 140 reach the rear corners of the vehicle and begin their movement across the back thereof, as shown in FIG. 6f. As the brushes move across the back of the vehicle, the arms 120 return to their initial positions against the bumpers 127 and the arms 130 continue to pivot toward their initial positions perpendicular to arms 120, thus moving forwardly in the direction of the movement of the vehicle to insure an effective cleaning of the back of such vehicle. Finally, as shown in FIG. 6g, the brushes return to their normal overlapping relation to insure an effective cleaning of the entire back end of the vehicle.

The operative steps of the initial embodiment, as shown in FIGS. 5a through 5g, are substantially similar. However, in the initial embodiment the arms 20 and 30 are allowed to pivot outwardly away from the path of the vehicle 35 to the extent that portions of the arms 20 and 30 may extend beyond the outermost portions of the frame. Consequently, the outward movement of the arms 120 is not restrained by bumpers, and the inward motion of the arms is restrained by the spring damper 42.

The advantages of the present invention are readily apparent from the preceding descriptions. The use of tension and compression springs along with the arm control damping cylinder permit the construction of a simple vehicle washing apparatus which is not only economical but which may be incorporated into an extremely compact and small unit. An effective cleaning action is provided without resort to complicated control mechanisms to operate the brushes. Such a simple and compact unit is easy to operate and requires a minimum of supervision and maintenance. Moreover, during the washing cycle none of the supporting arms pass over the top of the vehicle.

Although the present invention has been illustrated and described with reference to two specific embodiments, it will be understood that various modifications may be made by persons skilled in the art without departing from the spirit of the invention. For example, the lengths of the brush assembly arms and the positions of the inward stops may be adjusted to permit more or less overlap, and the position of maximum overlap may be set at the center of the vehicle path or may be offset. It should be further understood that the invention is not to be limited by the described embodiments but solely by the appended claims.

I claim

1. A vehicle washing apparatus comprising:

supporting frame means aligned along a predetermined path of a vehicle to be washed;

a first arm, one end of which is pivotally mounted to said frame means at a point outside path of said vehicle;

a second arm comprising an outer portion, one end of which is pivotally connected to the distal end of said first arm, and an inner portion adapted to move reciprocally and telescopically within the distal end of said outer portion, with one end of said inner portion remaining exposed beyond said distal end of said outer portion;

a rotatable brush means mounted at the exposed end of the inner portion of said second arm, said brush means being adapted to move across the front, along a side and across the back of said vehicle;

means to normally maintain said first arm in a position extending generally along said path at one side thereof;

means to normally maintain said second arm in a position extending generally transversely of said path whereby said brush means is in a position to be contacted by a vehicle moving along said path;

and means connected between said inner portion and said outer portions of said second arm to urge said inner portion of said arm out-wardly of said distal end of said outer portion.

2. A vehicle washing apparatus according to claim 1 further comprising antifriction means supporting said telescoping end of said inner portion within said outer portion of said second arm whereby rolling contact is maintained between said inner portion and said outer portion of said second arm.

3. A vehicle washing apparatus according to claim 2 wherein said antifriction means comprises a pair of rollers.

4. A vehicle washing apparatus according to claim 1 wherein said first arm position maintaining means and said second arm position maintaining means comprise tension springs.

5. A vehicle washing apparatus according to claim 1 wherein said means urging said inner portion of said second arm outwardly of said outer portion comprises a tension spring.

6. A vehicle washing apparatus according to claim 1 which includes a damping unit connected between said first arm and said second arm.

7. A vehicle washing apparatus according to claim 6 wherein the means connecting said damping cylinder to said second arm includes a lost motion linkage whereby said second arm may move a predetermined distance prior to the damping action of said damping cylinder taking effect.

8. A vehicle washing apparatus according to claim 1 further comprising means to limit the pivoting movement of said first arm to a predetermined distance such that said arm, at the extremity of its travel away from said vehicle path, extends outwardly of said path no farther than the outermost portion of said supporting frame means.

9. A vehicle washing apparatus according to claim 9 wherein said pivoting movement limiting means comprise bumper means.

10. A vehicle washing apparatus according to claim 1 wherein said arms when in their normal position prior to contact with a vehicle are in generally perpendicular relation with respect to each other.

11. A vehicle washing apparatus comprising:

supporting frame means aligned along a predetermined path of a vehicle to be washed;

a pair of rotary brush assemblies disposed opposite each other along said path, each said brush assembly including a first arm, one end of which is pivotally mounted to said frame means at a point outside path of said vehicle;

a second arm comprising an outer portion, one end of which is pivotally connected to the distal end of said first arm, and an inner portion adapted to move reciprocally and telescopically within the distal end of said outer portion, with one end of said inner portion remaining exposed beyond said distal end of said outer portion;

a rotatable brush means mounted at the exposed end of the inner portion of said second arm, said brush means being adapted to move across the front, along a side and across the back of said vehicle;

means to normally maintain said first arm in a position extending generally along said path at one side thereof;

means to normally maintain said second arm in a position extending generally transversely of said path whereby said brush means is in a position to be contacted by a vehicle moving along said path; and means connected between said inner portion and said outer portions of said second arm to urge said inner portion of said arm outwardly of said distal end of said outer portion.

* * * * *